J. L. WOOLDRIDGE.

MOTE BOARD FOR COTTON GINS.

APPLICATION FILED NOV. 14, 1917.

Reissued June 1, 1920.

14,874.

2 SHEETS—SHEET 1.

Witness

J. Gordon Spencer

Inventor

J. L. Wooldridge

By Robert A. Shumate

Attorney

J. L. WOOLDRIDGE.

MOTE BOARD FOR COTTON GINS.

APPLICATION FILED NOV. 14, 1917.

Reissued June 1, 1920.

14,874.

2 SHEETS—SHEET 2.

Witness

J. Andrew Sparkes

Inventor

J. L. Wooldridge

By Robert Newton

Attorney

UNITED STATES PATENT OFFICE.

JAMES L. WOOLDRIDGE, OF DECATUR, TEXAS.

MOTE-BOARD FOR COTTON-GINS.

14,874. Specification of Reissued Letters Patent. Reissued June 1, 1920.

Original No. 1,227,727, dated May 29, 1917, Serial No. 29,660, filed May 21, 1915. Application for reissue filed November 14, 1917. Serial No. 202,080.

*To all whom it may concern:*

Be it known that I, JAMES L. WOOLDRIDGE, a citizen of the United States, residing at Decatur, in the county of Wise and State of Texas, have invented certain new and useful Improvements in Mote-Boards for Cotton-Gins; and I do hereby declare the following to be a full, clear, and exact description of the invention, such as will enable others skilled in the art to which it appertains to make and use the same.

The invention relates to improvements in mote boards for cotton gins.

The object of the present invention is to improve the construction of mote boards for cotton gins and to provide a simple, practical, and comparatively inexpensive construction adapted to cause all of the motes, leaf trash, and other impurities and dust thrown off by the centrifugal action of the brush to be conducted away by a dust passage before the cleaned lint is subjected to the action of the current of air which carries the same through the conduit connecting the brush with the condenser whereby the current of air will be prevented from carrying the lighter impurities with the lint and cleaner cotton of a higher value will result.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings.

Like numerals of reference designate corresponding parts in the several figures of the drawings.

Figure 1:
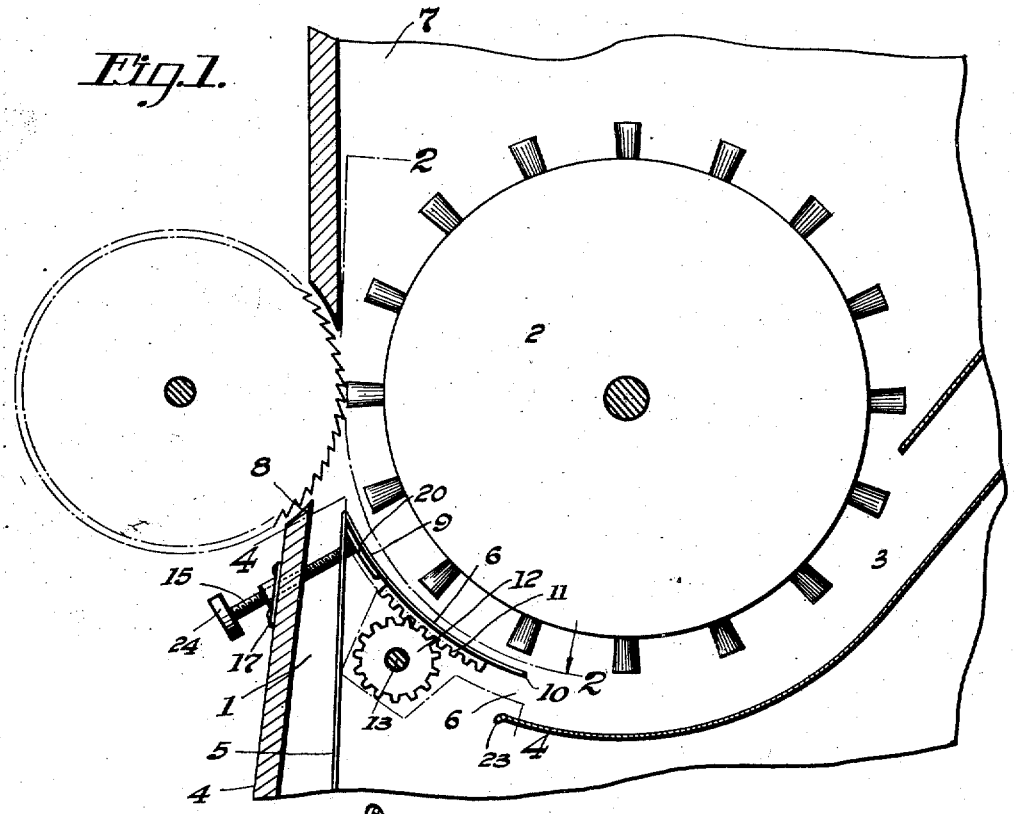
Figure 1 is a vertical sectional view through a portion of a cotton gin provided with a mote board constructed in accordance with this invention.
Figure 5:
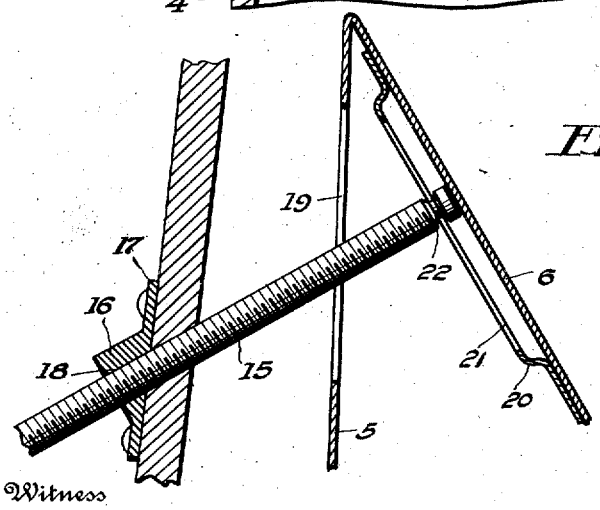
Fig. 5 is an enlarged detail sectional view illustrating the construction for adjusting the upper portion of the mote board.
Figure 2:
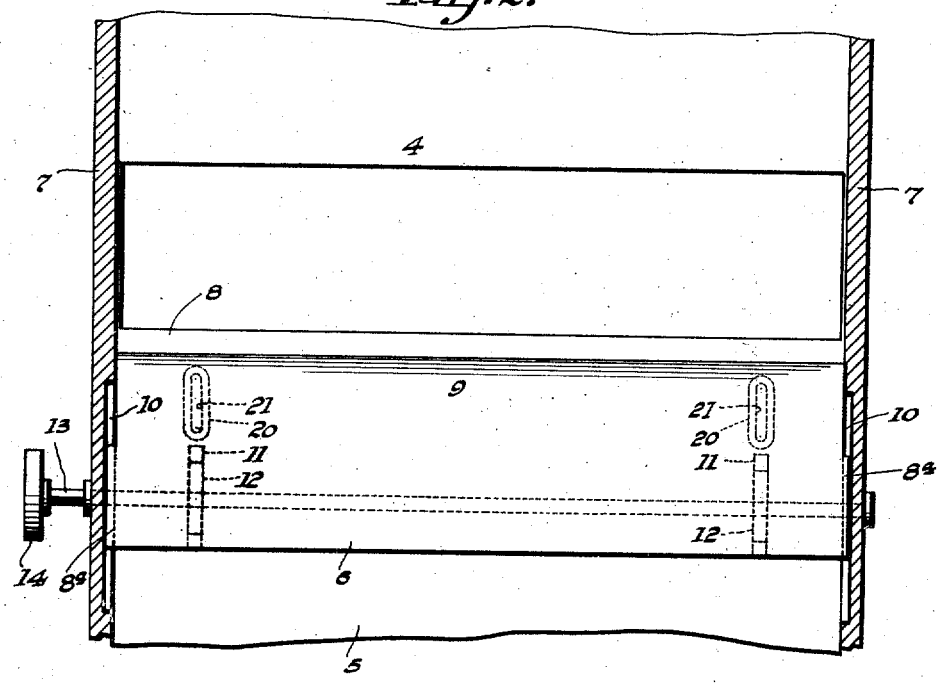
Fig. 2 is a vertical sectional view taken substantially on the line 2—2 of Fig. 1.
Figure 3:
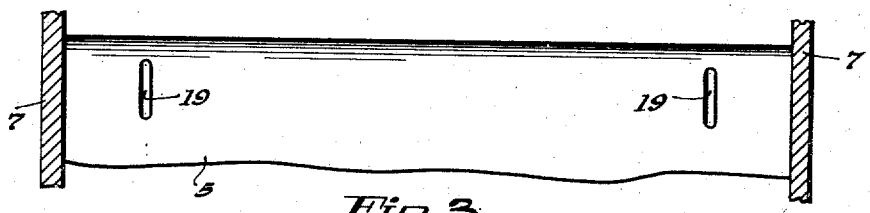
Fig. 3 is a detail view of a portion of the partition or wall of the dust passage that is carried by the mote board.
Figure 4:
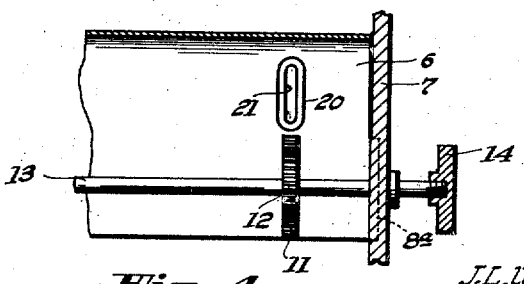
Fig. 4 is a detail sectional view taken substantially on the line 4—4 of Fig. 1.

In the accompanying drawings in which is illustrated the preferred embodiment of the invention, 1 designates a substantially vertical dust passage located directly beneath the engaging peripheral portions of a brush 2 and saws $3^a$ in position to receive all the impurities both light and heavy thrown off by the centrifugal action of the rotary brush 2 so that none of such impurities will reach the conduit 3 which conveys the cleaned cotton or lint from the rotary brush 2 to the condenser, not shown.

The substantially vertical dust passage is formed by a fixed wall 4 and a relatively movable adjustable wall 5 which is carried by a mote board 6 curved into substantial parallelism with the adjacent portion of the periphery of the rotary brush 2 and spaced from the adjacent end of the conduit 3 to provide an air inlet 6 for the current of air which forces the clean lint or cotton through the conduit 3. The partition 4 which extends across the casing of the gin preferably consists of a board suitably secured to the side walls 7 of the gin casing and beveled at its upper edge 8 adjacent the saws. The adjustable wall 5 which is preferably constructed of sheet metal extends downwardly from the upper edge of the mote board and is formed integral therewith but it may be of any other desired construction as will be readily understood. The lower portion of the curved mote board is provided at its ends with slight projections $8^a$, the upper portion 9 being reduced to arrange it clear of arcuate grooves 10 in which the projections $8^a$ slide in the upward and downward adjustment of the mote board to vary the relative size of the mouth or inlet of the dust passage and the space between the upper edge of the mote board and the rotary brush 2. The lower portion of the mote board is provided with curved rack bars 11 secured to the said mote board adjacent to the ends thereof and meshing with pinions 12 mounted on a transverse shaft 13 and adapted to be rotated by the same to move the mote board upwardly and downwardly longitudinally of the said slot. The transverse shaft 13 which is journaled in suitable bearings of the sides of the gin casing is extended at one end beyond the same and is provided with an exteriorly arranged operating device preferably in the form of a hand wheel 14 but any other suitable means may of course be employed for this purpose.

The upper reduced portion 9 of the mote board is resilient and is adjustable backwardly and forwardly with relation to the brush and the wall 4 by means of spaced adjusting screws 15 arranged at an inclination and engaging nuts 16 mounted on the said wall 4 exteriorly of the dust passage. The nuts 16 which have attaching flanges 17 are provided with inclined threaded openings 18 and the screws or threaded rods 15 which pierce the wall 4 extend through vertical slots 19 in the depending wall 5 carried by the mote board. The upper portion of the mote board which is adapted to be bent or flexed by the adjusting screws adjacent to the upper ends of the rack bars is provided with plates 20 having slots 21 which receive the upper ends of the inclined screws or rods 15. The slotted portions of the plate 20 are offset from the mote board and the upper ends of the screws or rods are provided with annular grooves 22 which are also tapered to permit a relative rocking movement of the parts. The upper portion of the mote board is slidable upwardly and downwardly with respect to the adjusting screws to enable it to be adjusted by the rack and pinion device and the flexing of the upper portion of the mote board permits the adjustment of the same toward and from the rotary brush. By this construction the desired location of the mote board and the wall 5 may be obtained. The lower edge of the mote board is arranged in overlapping relation with the adjacent edge 23 of the conduit 3 and the said edge 23 is bent downwardly slightly to form a flaring mouth or entrance for the air current. The upward and downward adjustment of the mote board and the lateral adjustment of the upper flexible portion thereof may be obtained by other means than that shown and the screws are provided at their lower ends with heads or wheels 24 to enable them to be readily operated.

Also instead of depending on the resiliency of the material of which the mote board is constructed to form a hinge joint the mote board may be constructed of any other material and any other suitable means may be employed for hinging the upper portion to the lower portion to enable the mote board to respond to the separate adjusting devices.

It will be seen that the mote board is exceedingly simple, and inexpensive in construction and that it causes all of the impurities thrown off through the centrifugal action of the rotary brush to be carried away by the dust passage before the lint or clean cotton is operated on by the current of air which forces the same through the conduit 3. Also it will be clear that the ginned cotton will be much cleaner than where the lighter impurities are carried by the current of air with the lint to the condenser and that the value of the cotton will be materially increased.

As illustrated, the mote board 6, its guide slots 10 and operating rack 11 are all struck from a common axis lying within and substantially concentric with the axis of the brush cylinder so that the up and down adjustment of the mote board will involve no substantial change in its spacing from the brush but will materially vary the position of the intake end of the lint flue formed between it and the brush relative to the path of the falling motes and when any substantial change in the size of the intake end of such lint flue is desired it must be obtained by the use of the screws 15 or equivalent means.

What is claimed is:—

1. A cotton gin of the class described including a saw, a rotary brush, a curved conduit wall located beneath the brush in spaced relation with the same, an outer relatively fixed wall extending downwardly from the saw adjacent to the inner edge thereof, an inner adjustable wall spaced from the outer wall to form a dust passage and having its upper edge arranged adjacent to the upper edge of the said outer wall and spaced from the brush, an inclined mote board extending downwardly from and connected with the upper edge of the inner wall and arranged in spaced relation with the brush to form a passage, the lower edge of the mote board being arranged in adjustable overlapping relation with the adjacent edge of the conduit wall, and the said inner wall being carried by the mote board.

2. A cotton gin of the class described including a saw, a rotary brush, a curved conduit wall located beneath the brush in spaced relation with the same, an outer relatively fixed wall extending downwardly from the saw adjacent to the inner edge thereof, an inner adjustable wall spaced from the outer wall to form a dust passage and having its upper edge arranged adjacent to the upper edge of the said outer wall and spaced from the brush, an inclined mote board extending downwardly from and connected with the upper edge of the inner wall and arranged in spaced relation with the brush to form a passage, the lower edge of the mote board being arranged in adjustable overlapping relation with the adjacent edge of the conduit wall, and the said inner wall being carried by the mote board, adjusting means located between the mote board and the inner wall for adjusting the said mote board upwardly and downwardly and separate adjusting means mounted on the relatively fixed wall and extending through the inner wall and connected with the mote board at the upper edge thereof for moving the upper portion of the mote board inwardly and outwardly.

3. A cotton gin of the class described including a saw, a rotary brush, a curved conduit wall located beneath the brush in spaced relation with the same, an outer relatively fixed wall extending downwardly from the saw adjacent to the inner edge thereof, an inner adjustable wall spaced from the outer wall to form a dust passage and having its upper edge arranged adjacent to the upper edge of the said outer wall and spaced from the brush, an inclined mote board extending downwardly from and connected with the upper edge of the inner wall and arranged in spaced relation with the brush to form a passage, the lower edge of the mote board being arranged in adjustable overlapping relation with the adjacent edge of the conduit wall, and the said inner wall being carried by the mote board, means for adjusting the mote board upwardly and downwardly, an inclined adjusting screw mounted on the fixed wall and extending through the inner adjustable wall and having a head at its upper end, an inclined plate secured to the mote board and having a longitudinal slot receiving the head of the screw, whereby the latter is slidably and rotatably connected with the mote board, said inner wall having a slot for the passage of the said screw.

4. In a cotton seed linter, a saw cylinder, doffing means therefor, a lint eduction flue, a mote-board having its forward end juxtaposed to a vertical plane between said saw cylinder and its doffing means and its rear end disposed to deliver the lint into said flue, and means to adjust the mote-board toward and from said plane and concentrically with reference to said doffing means to maintain substantially constant the intake opening for, and therefore the volume or velocity of, the lint bearing air current in said flue.

5. In a cotton seed linter, a saw cylinder, doffing means therefor, a lint eduction flue, a mote-board having its forward end juxtaposed to a vertical plane between said saw cylinder and its doffing means and its rear end disposed to deliver the lint into said flue, and means to adjust through a curvilinear path the mote-board toward and from said plane, said means to hold the mote-board to a line of travel adapted to maintain constant the air intake opening for the lint bearing air current in said flue.

6. In a cotton seed linter, a saw cylinder, a doffing means therefor, a lint flue toward which the doffing means induces an air current, a mote-board adapted to split said current diverting part below it and part with the lint above it into said flue, and means to vary the position of said mote-board relatively to the path of the falling motes, said means being adapted to confine the mote-board to a line of travel which will maintain constant the air intake openings for the said air currents.

7. In a cotton seed linter, a saw cylinder, a brush cylinder, a bodily movable mote-board mounted below the brush cylinder and having its upper face concave and a downwardly inclined apron at its front end, mechanism to move said mote-board through an arcuate path of travel substantially concentric with said brush cylinder, and a lint flue into which said mote-board directs the lint and a part only of the lint-bearing current of air induced by the brush cylinder, the rear end of the mote-board being spaced from the bottom of said flue to admit thereinto an additional current of air to carry off the lint.

8. In a linter gin, a saw cylinder, a brush cylinder, a mote board having a concave top portion, a wind shield depending from the front edge of said board, guides to confine the adjustments of said mote board to a curvilinear path substantially concentric with the brush cylinder, and a lint flue, the rear portion of the mote-board being disposed between and spaced from the brush cylinder and the bottom of said lint flue throughout the adjustments of the mote-board.

9. In a linter gin, a saw cylinder, a brush cylinder, a mote board having a concave upper surface disposed in substantially concentric relation with the center of the brush cylinder, mechanism for adjusting the mote board in a curvilinear path toward and from a vertical plane through the intersection of the brush and saw cylinders, a wind shield depending from the forward end of the mote board, and forming part of a mote eduction flue, and a lint flue into which the rear end of said mote-board projects, said mote-board being disposed so that the lint passes over it and the main lint-bearing air current passes under it into said flue, substantially as described.

In testimony whereof I affix my signature.

JAMES L. WOOLDRIDGE.

Witness:

R. L. THOMPSON.